March 6, 1962 E. H. HARTMAN 3,023,460
PROCESS OF VULCANIZING RUBBER INCLUDING A DELAYED
ADDITION OF ULTRA-ACCELERATOR
Filed Jan. 3, 1958 2 Sheets-Sheet 1
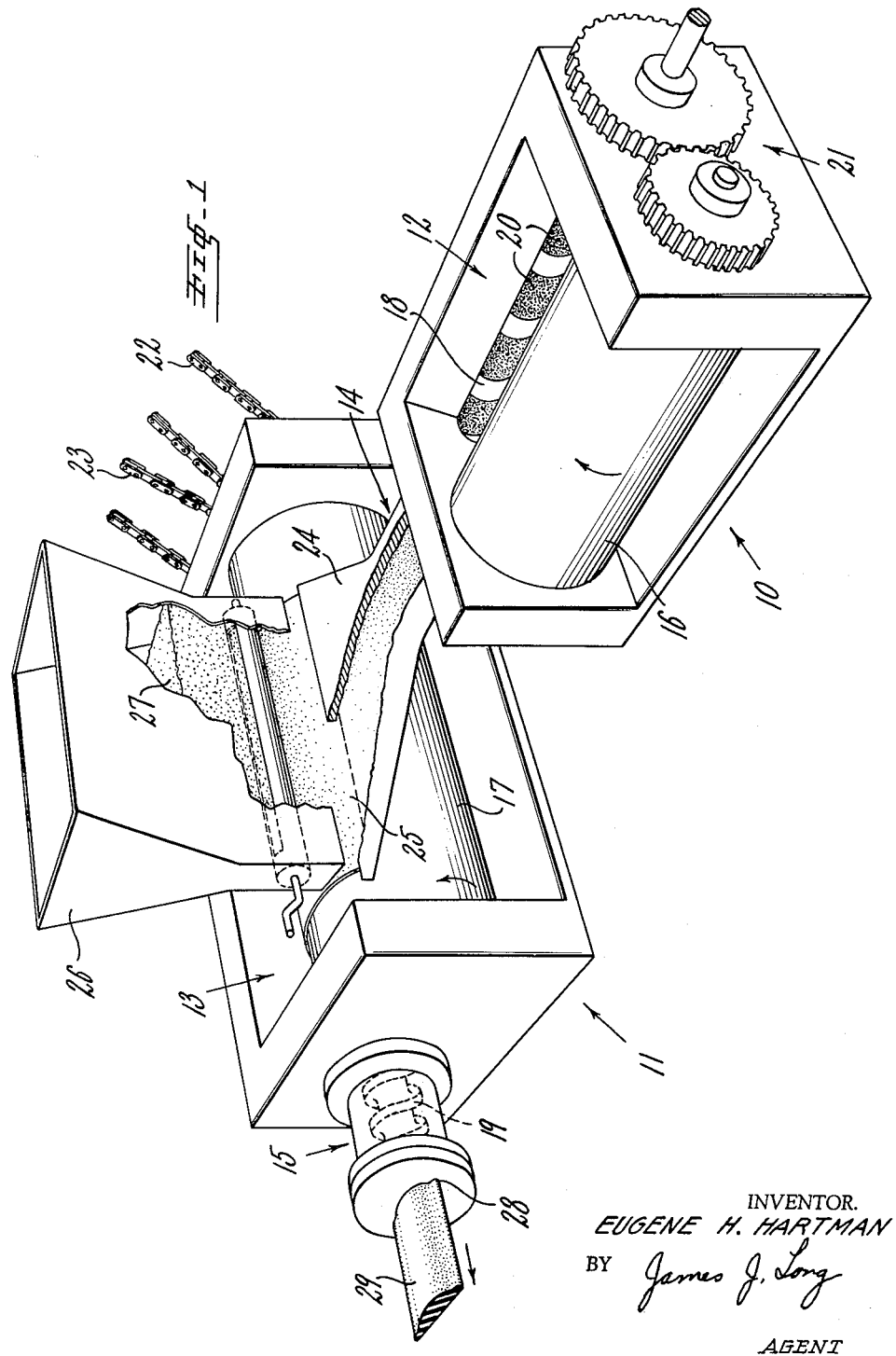
INVENTOR.
EUGENE H. HARTMAN
BY James J. Long
AGENT

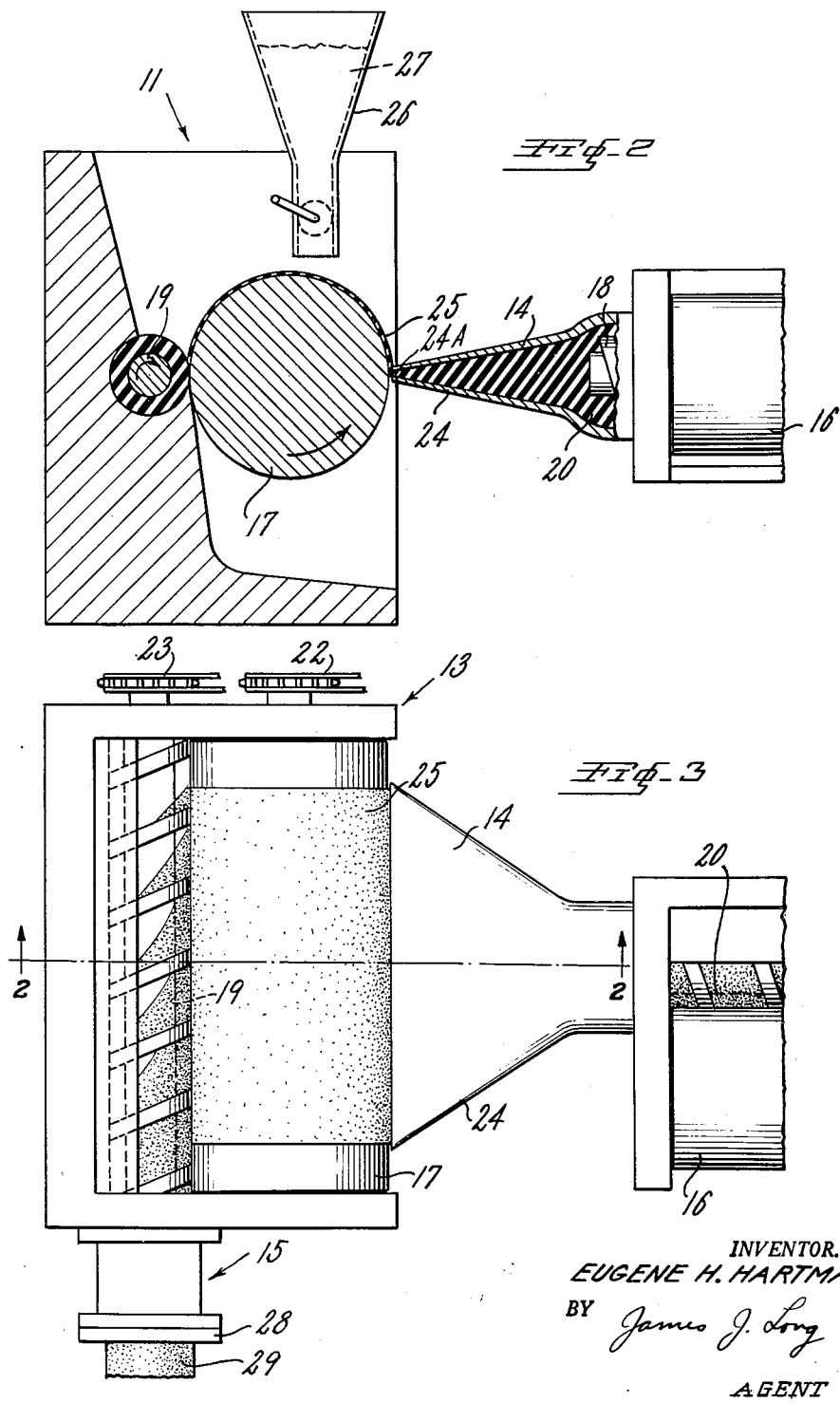

United States Patent Office 3,023,460
Patented Mar. 6, 1962

3,023,460
PROCESS OF VULCANIZING RUBBER INCLUDING A DELAYED ADDITION OF ULTRA-ACCELERATOR
Eugene H. Hartman, Boonton, N.J., assignor to United States Rubber Company, New York, N.Y., a corporation of New Jersey
Filed Jan. 3, 1958, Ser. No. 707,046
7 Claims. (Cl. 18—55)

This invention relates to rubber processing. More particularly it relates to a method involving incorporating a compounding ingredient in rubber in a manner which allows the rubber to be compounded for more rapid vulcanization than is ordinarily feasible.

A principal object of the invention is to cut down the time required for manufacture of rubber products, specifically by reducing the time required for vulcanization.

The invention will be described with reference to the accompanying drawings, wherein:

FIG. 1 is a largely schematic perspective view of one arrangement of apparatus suitable for carrying out the invention;

FIG. 2 is a fragmentary elevational view of the apparatus of FIG. 1 taken partly in section along the line 2—2 of FIG. 3; and FIG. 3 is a fragmentary plan view of the apparatus of FIG. 1.

In accordance with the invention rubber stock containing compounding ingredients is formed into an extremely thin sheet, and there is then applied to the surface of such sheet a compounding ingredient of a kind and in a quantity such as to render the stock extremely rapidly vulcanizable. The stock is then mixed further, to blend in the compounding ingredient uniformly, and shaped into a desired form, such as a tire tread, by any suitable method, such as by extrusion, care being taken to limit the time and temperature of such further mixing and shaping so as not to scorch the stock, which is now extremely heat-sensitive. The stock may then be vulcanized in the desired shape, usually in a mold, in a much shorter time and/or at a lower temperature than required in conventional methods.

Referring to the drawings, a device suitable for carrying out the present method includes two mill-extruders 10, 11 arranged in series. Suitable mill-extruders are described in detail in U.S. Patent 2,838,790 issued to the present inventor, E. H. Hartman, on June 17, 1958. Each mill-extruder, as the name implies, is a combination of a milling section 12, 13 with an extrusion section 14, 15. The milling section includes in each case a mill roll 16, 17 and cooperating screw 18, 19 adjacent and parallel thereto capable of working rubber stock 20 and delivering it directly to the extrusion section.

In the first mill-extruder, the screw and roll are commonly driven through gearing 21 actuated by a motor (not shown), while in the second mill-extruder the screw and roll are independently driven, as by drive chains 22, 23 associated with suitable motors (not shown). The extrusion section of the first extruder carries a spreader head 24 having an elongated orifice 24A (FIG. 2) disposed parallel to and in close proximity to (e.g., .005 to .050 inch clearance) the feed roll 17 of the second mill-extruder. The spreader head discharges directly onto this feed roll. This feed roll is adapted to be cooled or heated internally by flowing a stream of water through it by conventional means (not shown).

In practicing the invention the raw rubber stock may first be broken down and mixed with the usual compounding ingredients in internal mixers or roll mills (not shown) preparatory to charging it to the milling section 12 of the first mill-extruder 10. The stock as thus initially compounded is not rapidly vulcanizable, that is, the initial stock is devoid of any ingredient or combination of ingredients which would be capable in itself of rendering the stock rapidly vulcanizable. In typical embodiments of the invention the stock as initially compounded either contains no accelerator, or, if it does contain an accelerator, it does not contain sufficient accelerator, nor a sufficiently powerful accelerator, to be unduly heat-sensitive or rapidly vulcanizable. In another form of the invention the stock may contain an accelerator of the kind that requires an activating or sensitizing substance in order to act rapidly, in which case such activating or sensitizing ingredient is omitted from the initial stock. In another embodiment of the invention the vulcanizing agent, such as sulfur, is omitted from the initial stock. More than one of the ingredients necessary for rapid vulcanization may be omitted from the initial stock, for example, the initial compound may be devoid of both accelerator and vulcanizing agent, at least in a quantity sufficient to induce rapid vulcanization. One example of such a stock is the following tire tread stock:

| | Parts |
|---|---|
| Rubber (e.g. Hevea and/or GR–S) | 100 |
| Carbon black | 50 |
| Plasticizer (e.g. paraffin oil) | 6 |
| Zinc oxide | 3 |
| Antioxidant (e.g. the reaction product of diphenylamine and acetone known as "BLE") | 2 |
| Accelerator (e.g. mercaptobenzothiazole) | 0.5 |
| Sulfur | 2.25 |

A stock of this kind is relatively slowly vulcanizable, and might require heating at a temperature of about 300° F. for a period of some 18 minutes to vulcanize it to a substantial extent. In this respect the stock is at this stage similar to ordinary tread stocks and the like which cannot be compounded for extremely rapid vulcanization in conventional practice because they would scorch or prevulcanize in the mixing or shaping equipment.

The stock as initially compounded is fed to the first mill-extruder and emerges from the spreader head 24 (the orifice 24A (FIG. 2) of which typically has a thickness of about ½ inch) thereof directly onto the rapidly driven and cooled feed roll 17 of the second mill-extruder. The stock is drawn away from the die orifice by the roll at a more rapid linear speed than the stock is passing through the die orifice. The feed roll 17 of the second mill-extruder is rotated rapidly enough to accomplish this. For example, the linear speed of the stock as it passes through the die orifice might be 10 feet per minute, while the peripheral speed of the roll might be 500 feet per minute. The stock is thereby drawn out and attenuated by the roll to a thickness of preferably 0.010 to 0.050 inch (or even down to a thickness of only 20 microns), but in any case preferably not substantially greater than ⅛ inch. This action is best seen in FIG. 2. In this way the rubber stock is rapidly greatly attenuated into the form of an extremely thin sheet 25 without suffering any great rise in temperature. Typically the temperature rise of the stock during attenuation is only about 20°–30° F., as compared to a typical figure of about 100° F. temperature rise in an ordinary extrusion or sheeting operation. Other sheeting devices such as a calender (not shown) can less preferably be used to form the thin rubber sheet 25, but the disadvantage of such other devices is that they heat up the stock considerably in the process of attenuation, and therefore, if they are used, the sheet has to be allowed to cool off considerably before the next step of the process.

In the next step of the process a further compounding ingredient, capable of converting the stock into a very rapidly vulcanizable stock, is spread as uniformly as possible over the surface of the rubber sheet 25 as it passes into the second mill-extruder. For this purpose one or more accelerators of rubber vulcanization known as ultra accelerators may be used. In general, there is added at this stage the ingredient or combination of ingredients that was deliberately avoided in the initial compounding of the stock, and that is capable of vulcanizing the stock very rapidly. Such compounding ingredient may be referred to as a "vulcanization ingredient" in which term I include as equivalents, for purposes of the invention, ultra-accelerators, ordinary accelerators in larger quantity, vulcanizing agents such as sulfur, and activating substances or the like. It will be understood by those skilled in the art that such vulcanization ingredient is selected in kind and amount appropriate to convert the stock as originally compounded for slow vulcanization into an extremely rapidly vulcanizable stock. Thus, if the stock as initially compounded was such as to be capable of rapid vulcanization except for want of a deliberately omitted ultra-accelerator, then such ultra-accelerator is now added at this stage. Depending on the nature of the stock the accelerator added at this stage may be one which is not as powerful as the usual ultra accelerators, but in that event a greater quantity of accelerator must be added to achieve a desirable high rate of vulcanization. Similarly, if the vulcanizing agent, or some activating or sensitizing ingredient, was omitted in the initial compound, such vulcanizing agent or activating ingredient is now added at this stage, in a kind and quantity sufficient to make the stock rapidly vulcanizable. More than one such added ingredient (e.g., both vulcanizing agent and accelerator) may be introduced at this stage if necessary or desirable to produce the required rapidly vulcanizable stock. The accelerator or other ingredient capable of causing rapid vulcanization may be spread over the rubber sheet by hand, or with the aid of a suitable mechanical device such as a hopper or spreader 26 containing a supply 27 of the accelerator or the like.

It might be well to explain here that, as is well understood by those skilled in the art, accelerators may be broken down into three categories, ultra (or ultra-rapid), intermediate and rapid. The ultra category might involve a curing time of but a few minutes at temperatures as low as 200° F. or lower. Examples in this grouping are the condensation product of acetaldehyde butyraldehyde and aniline; aryl-alkylamines, zinc-alpha-phenylbiguanide; zinc ethyl (or isopropyl) xanthate; butylxanthic disulfide, and dithiocarbamates such as zinc diethyl dithiocarbamate. The intermediate category includes accelerators causing cure in about 30 minutes at 200–300° F. Mercaptobenzothiazole is an example. The third and final grouping, the so-called rapid class of accelerators (really quite slow compared to the foregoing classes) of which diphenyl guanidine is an example, would effect a cure in longer than 30 minutes at 300° F. In normal factory practice for making tire treads and similar articles the use of the ultra accelerators is out of the question, because the time and temperature conditions to which the stock is subjected in such devices as ordinary extruders and calenders are such that premature vulcanization would take place. Therefore, the practice in tire factories and the like has been to confine compounding to the intermediate or so-called rapid class of accelerators with the result that relatively long curing times, with consequent reduced productivity, had to be tolerated.

After the additional ingredient or ingredients, capable of converting the stock to a readily vulcanizable condition, are applied to the rubber sheet the now extremely rapidly vulcanizable stock, still in the form of the aforesaid extremely thin sheet 25 on the surface of the second mill roll 17 is carried by rotation of such mill roll into engagement with the second screw 19. It will be noted that the thin sheet 25 remains in contact with the surface of the second mill roll 17 in substantially unchanged physical shape until the sheet contacts the second screw 19. The second screw 19, as best seen in FIGS. 2 and 3, then immediately wipes or scraps the thin sheet 25 from the surface of the rotating roll 17 and kneads or churns the stock repeatedly thereby very quickly and evenly distributing the added ingredient throughout the stock. The portion of the screw 19 in the milling section 13 of the second mill-extruder thereby serves as a mixing device, to which the thin sheet 25 is delivered on the surface of the mill roll 17 in unchanged shape, and in which the thin sheet becomes quickly transformed directly into a mass of thoroughly mixed stock by the kneading and churning action of the screw, as the screw scrapes the thin sheet from the surface of the mill roll and works it into the extrusion barrel. The stock is then forced by the action of the screw through a die 28 on the second extrusion head, from which the stock emerges in the form of a raw tire tread 29 or other desired profile. Since the stock at this stage is extremely rapidly vulcanizable it is essential to keep the temperature rise in the second mill-extruder to a minimum by keeping the time of dwell of the stock in the second mill-extruder to a minimum. The advantage of the arrangement of apparatus shown is that it typically takes only about 30 seconds to mix and shape the stock, from the time the accelerator is applied to the sheet to the time the shaped stock emerges from the final die. The danger of premature vulcanization of the stock in the second mill-extruder is almost negligible, since the time of dwell is so short.

The raw rapidly vulcanizable tire tread 29 may, in accordance with conventional practice, be applied to a tire carcass and placed in a tire mold in the usual manner. It is possible to vulcanize or cure the tire tread in a fraction of the time required in conventional practice. For example, when employing the tread recipe exemplified above, and subsequently adding 2 parts of zinc dibutyl dithiocarbamate as the ultra accelerator to the thin rubber sheet by the method described, the tread stock (one inch thick) can be cured in 8 minutes at a temperature of 300° F. to yield a vulcanizate having excellent physical properties (this compares to a curing time of more than 18 minutes with the conventional stock from which the ultra accelerator is omitted). If it were attempted to mix such a highly accelerated stock in an internal mixer or roll mill, or otherwise process it as in conventional extrusion operations it would scorch or vulcanize prematurely.

Similar advantages are obtainable in accordance with the invention by adding to the stock, whether a tread recipe or a stock suitable for making other rubber articles such as hose, belting, etc., an accelerator which is not an ultra-accelerator, but which is added in sufficient quantity (with or without conventional activating ingredients or the like) to render the stock unusually rapidly vulcanizable. It will be understood that such large quantities of even an intermediate or rapid organic accelerator could not be employed in conventional practice, because the resulting rapidly vulcanizable stock would be subject to premature vulcanization during the conventional Banbury mixing, storage, mill warm-up or extrusion stages of conventional processing. Extremely rapidly vulcanizable stocks cannot safely be subjected to the long and severe heat history inherent in ordinary factory practice.

The accelerator applied to the surface of the thin sheet of rubber stock in accordance with the invention as described may be the same as or different from an accelerator already present in the stock. The added accelerator may take the form of an activating substance, which may act on another accelerator already present, or may act on an accelerator added along with such activating substance. It will be understood that in any case the essential point is to add to the thin sheet a compounding ingredient which, for the first time in the history of the stock, renders the stock rapidly vulcanizable.

A preferred modification of the invention is exemplified by a stock similar to the recipe listed previously, but containing no accelerator. Such stock may be passed through the first mill-extruder and formed into an extremely thin sheet as described, whereupon there is spread onto the surface of such sheet 1.7 parts of diphenyl guanidine and 3.3 parts of mercaptobenzothiazole, per 100 parts of rubber. This renders the stock extremely rapidly vulcanizable, and the stock thus compounded is in fact much too rapidly vulcanizable to be processed in the conventional manner. The compounded stock displays advantages similar to the previously exemplified stock which contained ultra-accelerator. Another modification of the invention is illustrated by a stock similar to the recipe listed above but containing no sulfur, and containing, as the accelerator, for example, 2–3 parts of zinc dibutyl dithiocarbamate. Although this stock as thus compounded contains ultra-accelerator, it is not rapidly vulcanizable because it contains no vulcanizing agent (sulfur) on which such accelerator can act. After passing this stock through the first mill-extruder and forming a thin sheet as described, some 2–3 parts of sulfur are added, whereupon the stock for the first time is rendered extremely rapidly vulcanizable.

By thus making it possible to employ accelerators in large quantity, or extremely rapid accelerators, or accelerators in combination with powerful activators, without danger of scorching the rubber stock, the invention affords a way of greatly increasing the productivity of expensive vulcanizing presses. The invention also makes it feasible to reduce the heating requirements of vulcanizing presses, because satisfactory cures can be obtained in reasonable times at lower temperatures than are required in conventional practice. Such lower vulcanizing temperatures decrease the rate of deterioration of the curing bags or blankets used in tire molds.

The invention effects a marked improvement in normal rubber manufacturing processes, wherein emphasis is usually upon the speed of operation. Thus, it would be very desirable in the extrusion and cure of rubber products, such as tire treads, that ultra accelerators be employed. Up to now this has not been feasible since the accelerator has had to be added at the internal mixer or roll mill and the highly accelerated stock would then have to undergo considerable heating in the Banbury mill. It is also quite common, for the compounded stock to undergo storage for a length of time thus necessitating some additional and sometimes lengthy heating on a warm-up mill prior to actual extrusion. On the warm-up mill, large quantities are put on at a time and only small quantities removed at a time so that some stock is on the mill for quite some time perhaps even hours. Anywhere along this path, the rubber could and often would cure prematurely if the accelerator action was too rapid. Hence only the intermediate and the rapid type accelerators were currently in common usage, and they were limited to quantities that would not produce extremely rapid vulcanization, in rubber-extrusion operations prior to the invention. The invention, in contrast, permits the use of ultra accelerators, or large quantities of the slower accelerators (with activators if desired), and therefore much more rapid curing in rubber extrusion operations by permitting the addition of accelerator just prior to the extrusion operation, as described, or by permitting the accelerator to be mixed in initially (the sulfur or other vulcanizing agent being withheld) and the sulfur or the like to be added just prior to the extrusion operation.

Having thus described my invention, what I claim and desire to protect by Letters Patent is:

1. A method of processing rubber comprising mixing the rubber with a vulcanizing agent but no ultra accelerator of vulcanization charging the rubber to a first mill-extruder from which it is discharged into peripheral contact with a roll of a second mill-extruder, the said roll being cooled and being rotated at a peripheral speed greater than the linear speed at which said stock is emerging from the first mill-extruder whereby the stock is greatly attenuated into the form of a thin sheet having a thickness of from about 20 microns to about ⅛ inch with a resultant temperature rise of less than about 30° F., applying ultra accelerator for said vulcanizing agent to the surface of the sheet, thereafter scraping the sheet from the roll by means of a cooperating screw of the second mill-extruder in which screw of said second mill-extruder the rubber is kneaded and immediately thereafter extruded in a desired profile, the time of dwell and the temperature rise in the second mill extruder being insufficient to scorch the rubber.

2. A method of processing rubber stock comprising providing initially a rubber stock incapable of rapid vulcanization, extruding the said rubber stock in the form of a sheet through an elongated orifice disposed parallel to and in close proximity to an attenuating surface moving at a speed greater than the linear speed of extrusion of said sheet whereby the sheet is greatly attenuated to a thickness of from 20 microns to ⅛ inch, applying to the surface of the attenuated sheet carried on said attenuating surface, a vulcanizing ingredient in an amount sufficient to render the stock rapidly vulcanizable, substantially immediately thereafter scraping the entire sheet from the said attenuating surface and immediately kneading the sheet to distribute the vulcanizing ingredient uniformly throughout the stock, thereafter extruding the stock in a desired profile, and subsequently vulcanizing the stock in a desired shape by the action of said vulcanizing ingredient.

3. A method as in claim 2 in which the said vulcanizing ingredient is an ultra-accelerator.

4. A method as in claim 2 in which the temperature rise during formation of said attenuated sheet is less than about 30° F.

5. A method of processing rubber stock comprising, providing initially a non-vulcanizable rubber stock containing an accelerator of vulcanization but no vulcanizing agent, extruding the said rubber stock in the form of a sheet through an elongated orifice disposed parallel to and in close proximity to an attenuating surface moving at a speed greater than the linear speed of extrusion of said sheet whereby the sheet is greatly attenuated to a thickness of from 20 microns to ⅛ inch, applying to the surface of the attenuated sheet carried on said attenuating surface a vulcanizing agent, in an amount sufficient to render the stock rapidly vulcanizable, substantially immediately thereafter scraping the entire sheet from the said attenuating surface and immediately kneading the sheet to distribute the vulcanizing agent uniformly throughout the stock, thereafter extruding the stock in a a desired profile and subsequently vulcanizing the stock in the desired shape by the combined action of said vulcanizing agent and said accelerator of vulcanization.

6. A method as in claim 5 in which the said accelerator is an ultra-accelerator.

7. A method as in claim 5 in which the resultant temperature rise during formation of said attenuated sheet is less than about 30° F.

References Cited in the file of this patent

UNITED STATES PATENTS

| | | |
|---|---|---|
| 1,434,908 | Morton et al. | Nov. 7, 1922 |
| 1,701,946 | Cadwell | Feb. 12, 1929 |
| 2,175,125 | Mack et al. | Oct. 3, 1939 |
| 2,431,085 | Shelmerdine et al. | Nov. 18, 1947 |
| 2,478,885 | Alvey | Aug. 9, 1949 |
| 2,526,504 | Rehner et al. | Oct. 17, 1950 |
| 2,764,779 | Zona | Oct. 2, 1956 |

FOREIGN PATENTS

| | | |
|---|---|---|
| 747,934 | Great Britain | Apr. 18, 1956 |